United States Patent [19]
Morris

[11] 3,896,437
[45] July 22, 1975

[54] APPARATUS FOR GENERATING PRECISE CROSSOVER FREQUENCY OF TWO INDEPENDENT EQUAL BANDWIDTH SPECTRA

[75] Inventor: Richard H. Morris, Tampa, Fla.

[73] Assignee: Sperry Rand Corporation, New York, N.Y.

[22] Filed: Oct. 11, 1973

[21] Appl. No.: 405,344

[52] U.S. Cl. .................................. 343/17.7; 35/10.4
[51] Int. Cl.$^{2}$ ............................................ G01S 7/40
[58] Field of Search ...................... 343/17.7; 35/10.4

[56] References Cited

UNITED STATES PATENTS

| | | | |
|---|---|---|---|
| 2,953,780 | 9/1960 | Goldfischer | 343/17.7 |
| 3,332,078 | 7/1967 | Conrad | 343/17.7 |
| 3,375,518 | 3/1968 | Mader et al. | 343/17.7 |
| 3,471,858 | 10/1969 | Seyl et al. | 343/17.7 |
| 3,832,712 | 8/1974 | Goetz et al. | 343/17.7 |

*Primary Examiner*—T. H. Tubbesing
*Attorney, Agent, or Firm*—Howard P. Terry; Thomas J. Scott

[57] ABSTRACT

An apparatus for generating two spectra with an extremely precise crossover point including a noise generator that produces wideband noise signals and a source of high frequency clock signals both of which are coupled to first and second input terminals respectively on an M-stage digital filter that produces narrow band noise output signals centered at a frequency, $f_n$, for clock source output signals, $mf_n$. A pair of frequency generators produce line spectra frequencies at $f_H$ and $f_L$, respectively, in which $f_H$ is a frequency higher than $f_n$ and $f_L$ is a frequency lower than $f_n$. The two line spectra frequencies are coupled to the input of a switching unit for alternately selecting the frequencies $f_H$ and $f_L$ which are then coupled to a first input terminal on a mixer unit that has its second input terminal coupled to the output terminal of the digital filter. The difference output terminal on the mixer unit provides a first spectra having a bandwidth centered at the frequency $f_H - f_n$ and a second spectra having an equal bandwidth centered at the frequency $f_n - f_L$. Any change in frequency of the reference spectra signal, $f_n$, produces an equal and opposite change in the first and second spectras provided at the output terminal of the mixer; however, the crossover frequency between the first and second spectras is maintained precisely constant.

7 Claims, 8 Drawing Figures

APPARATUS FOR GENERATING PRECISE CROSSOVER FREQUENCY OF TWO INDEPENDENT EQUAL BANDWIDTH SPECTRA

The invention herein described was made in the course of or under a contract, or sub-contract thereunder with the Department of the Navy.

BACKGROUND OF THE INVENTION

1. Field of the Invention

The subject invention pertains to the field of signal generators and particularly to generators used in testing all-Janus doppler type airborne radars.

2. Description of the Prior Art

It is known in the prior art to simulate doppler signals by generating two noise spectra each of which modulates one of a pair of carrier signals. Each of the carrier signals have the same frequency but their respective phases are in quadrature. The two frequency-transformed spectra are summed in an adder circuit to form a single spectrum random in both amplitude and phase. In one embodiment of this prior art device the doppler-plus-noise spectrum is superimposed on a flat noise base by also coupling the outputs of the noise generators into a second adder circuit which produces a summed noise output which in turn is combined in a third adder circuit with the doppler-plus-noise spectrum to provide an output of a doppler-plus-noise spectrum superimposed on a flat noise base. Since the oscillator in this device provides a frequency, $f_n$, any change in this frequency due to drift in the oscillator will produce errors in the frequency of the output spectra.

The subject invention is an improvement of a simulated doppler generator described in Ser. No. 84,676, filed Oct. 28, 1970, now abandoned, and assigned to the same assignee as the subject invention which includes a noise generator for producing wide band noise signals. These signals are coupled to an M-stage digital filter that also receives a clock frequency input, $mf_n$, from a clock frequency source. The digital filter has a variable bandwidth that is controlled by a bandwidth select signal applied to a multi-position switch in the digital filter. Different resistor-capacitor combinations are selected at each switch position thereby providing circuits having correspondingly different bandwidths which produce narrow band noise output signals having selectably different bandwidths.

The narrow band noise output signals provided by the digital filter are coupled to a first input terminal on a mixer. The second input terminal on the mixer is coupled to a spectrum generator which includes a pair of clock sources for providing output frequency signals, $f_H$ and $f_L$, that are alternately selected through appropriate logic gates at a 32 Hz switching rate.

The different output signals from the mixer produce alternate frequency spectra centered at the frequency $f_H - f_n$ and $f_n - f_L$ respectively. Since both of the frequencies, $f_H$ and $f_L$ are higher than the center frequency, $f_n$, of the narrow band noise output signals from the digital filter, any change in the frequency, $f_n$, produces an equal change in the first and second spectra $f_H - f_n$ and $f_n - f_L$ which is cumulative. As a result any change in the frequency, $f_n$, produces a crossover frequency which can not be maintained precisely constant.

SUMMARY OF THE INVENTION

The subject invention includes a noise generator which provides wide band noise output signals coupled to a first input on an M-stage digital filter having a second input responsive to a clock frequency source and a third input responsive to a bandwidth select signal. The bandwidth select signal controls a multi-position switch which in turn selects one of a plurality of resistor capacitor combinations that provides different bandwidths for the circuits which comprise the digital filter. The digital filter provides a narrow band output having its center frequency, $f_n$, controlled by the clock frequency input, $mf_n$, and its bandwidth controlled by the bandwidth select signal.

A spectrum generator includes a pair of crystal controlled frequency generators for procuding a pair of frequency outputs, $f_H$ and $f_L$ which are higher and lower respectively than the frequency $f_n$. Each of the frequency generators may comprise a plurality of pairs of crystal controlled digital clocks which generate different pairs of high accuracy frequencies, $f_H$ and $f_L$, that are selectable through a switching means controlled by an input center frequency select signal. The outputs of the frequency generators are coupled to a plurality of logic gates such that the frequencies, $f_H$ and $f_L$, may be alter- the center frequency select signal to the logic gates. The alternately switched frequencies, $f_H$ and $f_L$ are then coupled from the spectrum generator to the second input on the mixer unit which produces a pair of alternate frequency spectra, $f_H - f_n$ and $f_n - f_L$, at the difference output terminal thereof.

Since the frequencies $f_H$ and $f_L$ are higher and lower respectively than the frequency, $f_n$, the crossover frequency, $f_c$, produced by the alternately provided frequency spectra, $f_H - f_n$ and $f_n - f_L$, remains precisely constant even in the presence of changes in the frequency, $f_n$.

In the application to an all-Janus type radar system employing a beam lobing technique, the pair of frequency spectra $f_H - f_n$ and $f_n - f_L$ produced as described herein and utilized for the respective ground speeds being simulated for the forward-looking and rearward-looking beams provide crossover frequencies having improved accuracy and stability.

DESCRIPTION OF THE PREFERRED EMBODIMENT

Figure 1A:
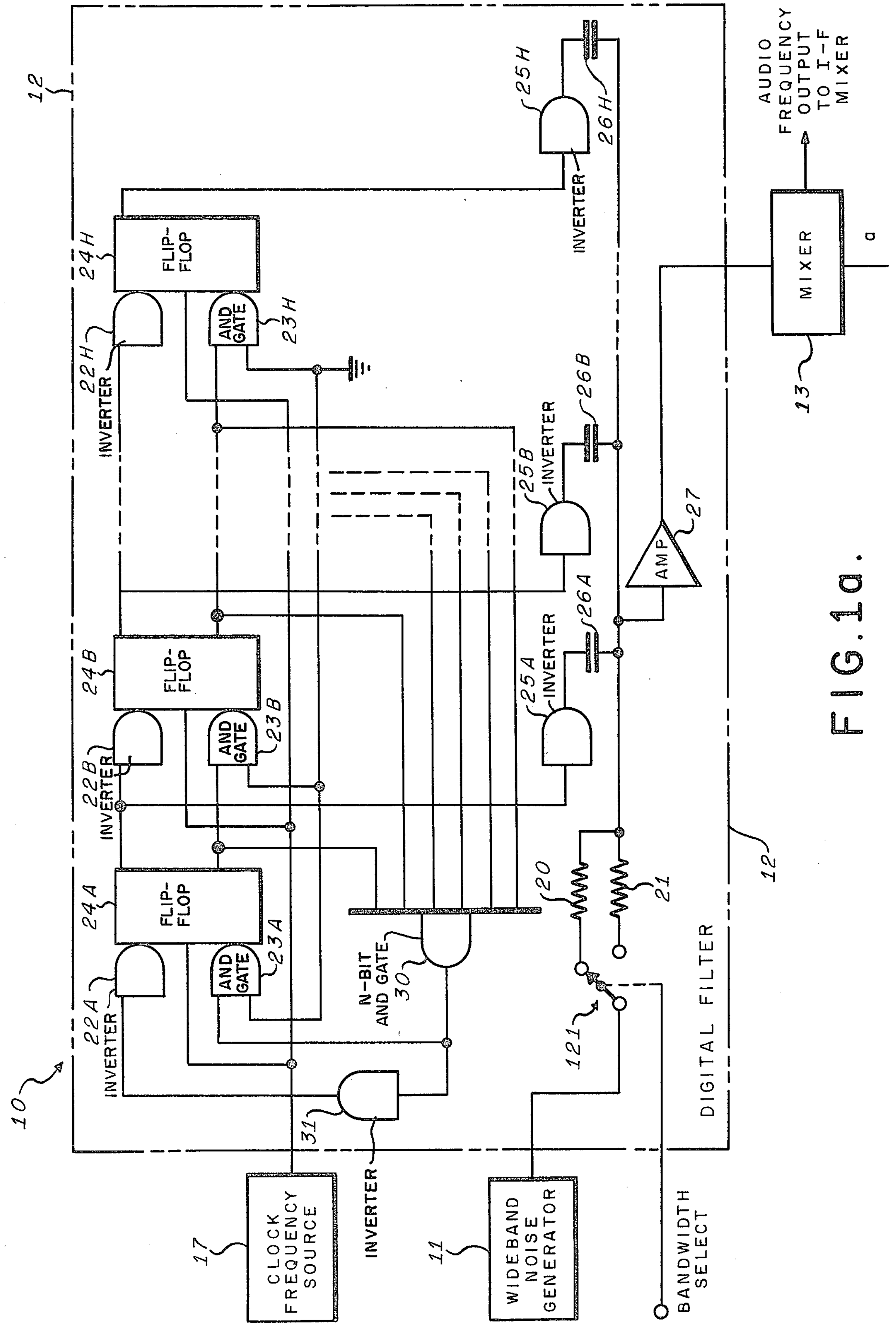
FIGS. 1*a* and 1*b* are block diagrams partly in schematic form of a doppler spectrum generator incorporating the invention.
Figure 1B:
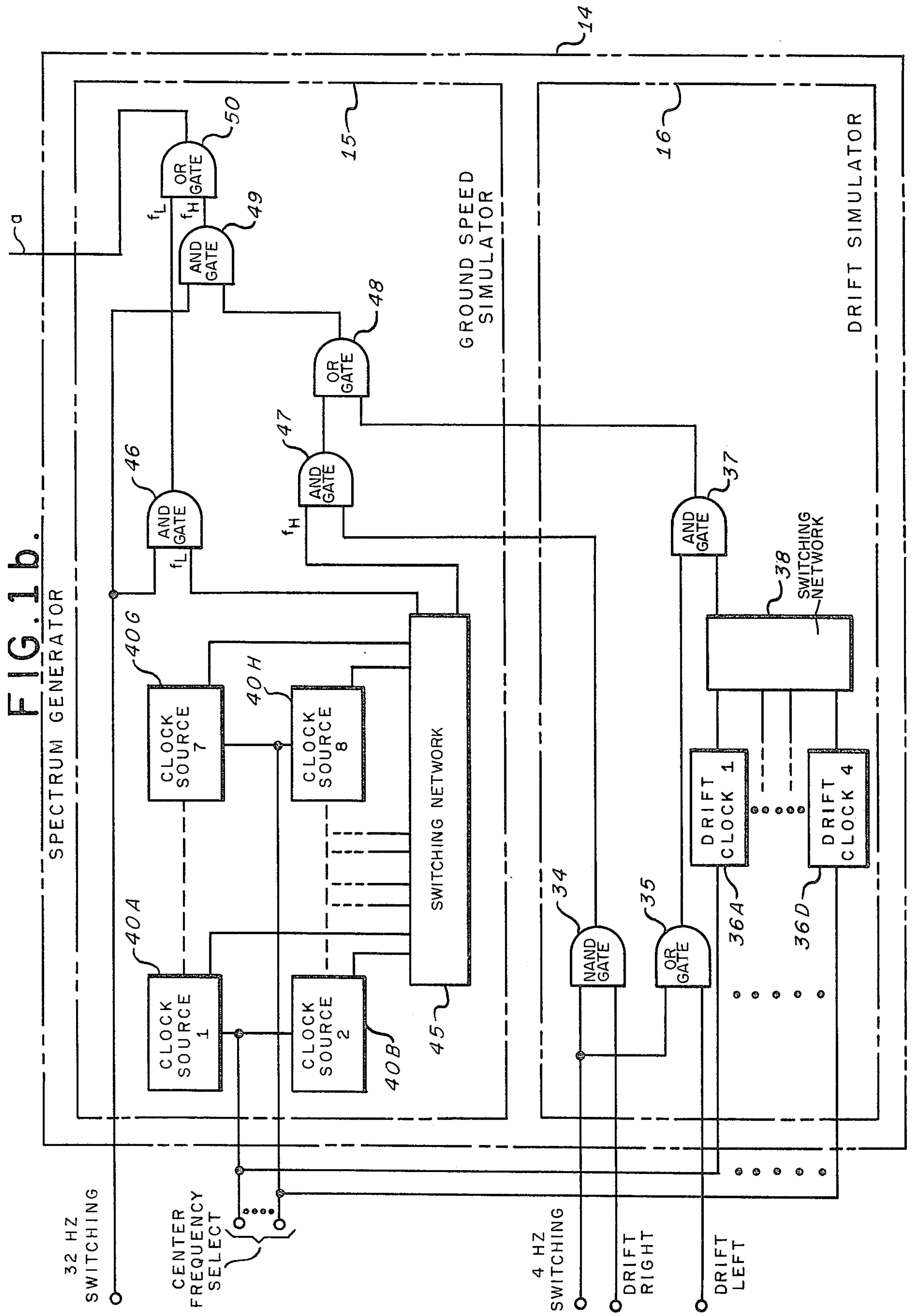

Referring to FIGS. 1*a*, and 1*b* the improved simulated doppler generator 10 includes a wide band noise generator 11 coupled to a first input terminal on an M-stage digital filter 12 that has its output terminal coupled to a first input terminal on a mixer 13. A spectrum generator 14 includes a ground speed simulator 15 and a drift simulator 16. The output terminals of the drift simulator 16 are coupled into a pair of input terminals on the ground speed simulator 15 which has its output terminal coupled to a second input terminal on the mixer 13.

A single input-multiple output switch 121 in the digital filter 12 is responsive to a bandwidth select which selects one of the multiple outputs on the switch 121 that is coupled to the first input terminal of the digital filter 12. Typically the switch 121 may be a multi-position mechanical switch or a multiple gate electronic switch. A first resistor 20 has one terminal coupled to a first output terminal on the switch 121 and its second terminal coupled to the input terminal of an amplifier 27. A second resistor 21 has one terminal coupled to a second output terminal on the switch 121 and its other terminal also coupled to the amplifier 27. The resistors 20 and 21 provide a capability of two bandwidths; however, any member of bandwidths may be provided by merely increasing the number of resistors and associated switch positions. Only one resistor is required for each different bandwidth desired.

A clock frequency signal, $mf_n$, is coupled from a clock frequency source 17 to a second input terminal on the digital filter 12 and applied to the clock input of each flip flop 24 A-H in a divider chain which also includes logic input gates 22 A-H and 23 A-H at the corresponding logic input terminals of each flip flop 24 A-H. Although flip flops 24 A-H represent an eight stage digital filter, additional stages could be added thereby increasing the Q of the filter. Alternatively stages could be eliminated thereby decreasing the Q.

A plurality of series circuits each comprised of an inverter 25 A-H and capacitor 26 A-H have the input of each inverter 25 A-H coupled to respective first output terminals on each of the flip flops 24 A-H in the divider chain and one terminal of each capacitor 26 A-H coupled to the input terminal of amplifier 27. A feedback circuit in the divider chain is comprised of logic gates 30 and 31 in which logic gate 31 has its input terminal coupled to the output terminal of logic gate 30, which may be an N-bit AND gate, and its output terminal coupled to the input terminal of logic gate 22A. The output terminal of logic gate 30 is also coupled to one input terminal of the logic gate 23A. Each of the plurality of input terminals on the logic gate 30 is coupled to respective second output terminals on each of the flip flops 24 A-G.

The ground speed simulator 15 shown in FIG. 1*b* includes 4 pairs of clock sources of which the first pair 40A, 40B and the last pair 40G, 40H are illustrated. Since each pair of clock sources will simulate a single ground speed it is understood that additional pairs of clock sources could be included in the simulator 15 to simulate additional ground speeds. A plurality of input terminals each of which is connected to a corresponding pair of clock sources are responsive to center frequency select signals which gate on the specific pair of clock sources which will be used to generate specific clock frequencies $f_H$ and $f_L$ respectively. The outputs of each pair of clock sources are connected to a switching network 45 which couples a selected pair of clock source outputs to the respective output terminals of the switching network 45. The output frequency $f_L$ is coupled to a first input terminal on logic gate 46 and the output frequency signal $f_H$ is coupled to a first input terminal on the logic gate 47. The output terminal of the logic gate 47 is connected to a first input terminal on logic gate 48. The second input terminals on the logic gates 47 and 48 are coupled to first and second output terminals from the drift simulator 16 which will be explained in more detail below. The output terminal of the logic gate 48 is connected to a first input terminal on a logic gate 49. The second input terminals on the logic gates 46 and 49 are responsive to a switching signal which may be typically 32 Hz and is coupled through an input terminal on the spectrum generator 14 and an input terminal on the ground speed simulator 15 to the second input terminals on the gates 46 and 49. The output terminals on the logic gates 46 and 49 are coupled to first and second input terminals respectively on a logic gate 50. The output terminal on the logic gate 50 is coupled through output terminals on the ground speed simulator 15 and the spectrum generator 14 to a second input terminal on the mixer 13.

A lower frequency switching signal which may be typically 4 Hz is applied to an input terminal on the spectrum generator 14 and coupled to an input terminal on the drift simulator 16 from which it is connected to first input terminals on logic gates 34 and 35. Drift right and drift left signals are coupled through respective input terminals on the spectrum generator 14 and drift simulator 16 to second input terminals on the logic gates 34 and 35 respectively. Four drift clock sources of which the first 36A and last 36D are shown, provide drift frequency output signals having a value of frequency slightly higher than the frequency of one of the corresponding frequency outputs, $f_H$, produced by the clock sources in the ground speed simulator 15. It will be appreciated that the number of drift clock sources is limited only by the number of pairs of clock sources in the ground speed simulator 15. The output terminals of the drift clocks 36 A-D are coupled to a switching network 38 which couples the selected drift clock output in response to a center frequency select signal to the second input terminal on the logic gate 37. The output terminals on the logic gates 34 and 37 are coupled through output terminals on the drift simulator 16 and input terminals on the ground speed simulator 15 to the second terminals on the logic gates 47 and 48 respectively described above.

In operation the wideband noise generator 11 produces a wideband noise spectrum which is coupled through an input terminal on the digital filter 12 to the wiper arm on the switch 121. The clock frequency source 17 produces a clock frequency, $mf_n$, which has a typical frequency of 800 KHz and is coupled into the clock pulse input terminal on each of the plurality of flip flops 24 A-H of the divider chain. The digital filter 12 typically operates at a center frequency, $f_n$, which may be typically 100 KHz, thus the input coupled into the amplifier 27 will be switched by successive flip flops from each of the capacitors 26 A-H at a 100 KHz frequency. Further, for a clock frequency of 800 KHz the digital filter 12 must have eight stages (A-H) in order to produce an output signal having a center frequency at 100 KHz.

The bandwidth select signal is coupled through a third input terminal on the digital filter 12 to the switch 121 and controls the position of the wiper arm thereby selecting the combination of resistor 20 and capacitors 26 A-H or resistor 21 and capacitors 26 A-H which will determine the bandwidth of the digital filter 12. Typical values of bandwidth employed have been approximately 400 Hz and 800 Hz. The narrow band noise output pulse signal is coupled through the output terminal of the digital filter 12 to the first input terminal on the mixer 13.

A center frequency select signal which may be in the form of a voltage or the absence of a voltage is applied to a desired one of the center frequencies select inputs on the spectrum generator 14 which is coupled through the corresponding desired input on the ground speed simulator 15 to the specific pair of clock sources to provide clock frequencies $f_H$ and $f_L$ which may have typical values of 107,900 Hz and 92,900 Hz respectively. It should be noted that in the unimproved simulated doppler generator the frequencies $f_H$ and $f_L$ were both above the center frequency $f_n$ and had typical values of 107,900 Hz; 107,100 Hz and 100,000 Hz respectively. The selected frequencies $f_H$ and $f_L$ are coupled through the switching network 45 to the output terminals thereof and coupled into the input terminals of the logic gates 47 and 46 respectively. A switching signal which may be a clock pulse varying at a 32 Hz rate between positive and zero potential or zero and negative potential is coupled into the second input terminal on the logic gate 46 thereby providing the selected frequency $f_L$ at the output terminal of the logic gate 46 for alternate periods of the 32 Hz input switching signal. This output signal is coupled into the first input terminal on the logic gate 50. Simultaneously the other output frequency signal $f_H$ from the switching network 45 is coupled into the first input terminal on the logic gate 47 and will appear at the output terminal thereof in the absence of an input from the drift simulator 16 and will be coupled to the first input terminal on the logic gate 48 and will also be coupled therethrough in the absence of an input from the logic gate 37 in the drift simulator 16. Therefore, if the drift simulator 16 is not activated the frequency signal $f_H$ will be coupled through the logic gates 47 and 48 to the first input terminal on the logic gate 49. The second input terminal on the logic gate 49 will receive the 32 Hz switching signal and the output terminal of the logic gate 49 will provide the frequency $f_H$ during alternate periods of the 32 Hz switching signal which will be coupled into the second input terminal of the logic gate 50. As a result, the logic gate 50 will provide alternate outputs at a 32 Hz rate of the higher frequency $f_H$ and the lower frequency $f_L$ which will be coupled through the output terminals on the ground speed simulator 15 and spectrum generator 14 into the second input terminal on the mixer 13.

The mixer 13 is a standard frequency mixer which provides sum and difference outputs. However, for this application only the difference outputs are of importance. Therefore, the sum outputs are disregarded. The difference output terminal will provide alternate spectra outputs one of which will be equivalent to $f_H - f_n$ and the other $f_n - f_L$.

Drift is determined in an all-Janus type radar by comparing the sensed ground speed in the left radar beam with the sensed ground speed in the right radar beam. Drift is indicated by a sensed higher frequency in the radar beam in the direction of drift. For example, if the aircraft is drifting to the right, the frequency signal in the right radar beam will be at a higher frequency than the sensed frequency signal in the left radar beam and vice versa for drift to the left. The simulated doppler generator simulates drift by injecting a slightly higher frequency at a relatively low switching rate for the higher frequency $f_H$ of the selected pair of frequencies, $f_H$ and $f_L$. Drift right and drift left is simulated by switching the slightly higher drift frequency for the frequency $f_H$ at a corresponding phase.

For example, if the drift frequency is being switched with the frequency $f_H$ at a 4 Hz switching rate, drift left may be simulated by switching the drift frequency during the positive or high interval of the 4 Hz switching rate and drift right might be simulated by switching the drift frequency at the negative or low interval of the 4 Hz switching rate. Alternately drift left could be simulated by switching the drift frequency during the negative or low interval of the 4 Hz switching rate and drift right could be simulated by switching the drift frequency during the positive or high interval of the 4 Hz switching rate.

In operation the center frequency select signal which energizes a selected pair of digital clocks 40A, 40B–40G, 40H in the ground speed simulator 15 is also coupled to a corresponding one of the four drift clocks 36 A-D in the drift simulator 16. The output of the selected drift clock is coupled through the switching network 38 to the second input terminal on the logic gate 37. If drift is to be simulated a low frequency switching signal which may have a typical frequency of 4 Hz is coupled through corresponding input terminal on the spectrum generator 14 and the drift simulator 16 to the first input terminals on logic gates 34 and 35 respectively.

If drift right is to be simulated an appropriate signal either an electrical potential or the absence thereof depending on the type of logic being used is coupled into the second input terminal of the logic gate 34. As a result, the 4 Hz switching signal provided at the output terminal of the logic gate 34 and coupled through the output terminal on the drift simulator 16 and corresponding input terminal on the ground speed simulator 15 is applied to the second terminal on the logic gate 47. The high frequency signal, $f_H$, applied to the first input terminal on the logic gate 47 will thus be inhibited from being produced at the output terminal of the logic gate 47 during the negative interval of the 4 Hz switching frequency. The output of the logic gate 35 will be such as to enable the drift frequency applied to the second input terminal of the logic gate 37 to be produced at the output thereof during the negative interval of the 4 Hz switching signal. As a result, the logic gate 48 will produce the slightly higher drift frequency from the selected one of the four drift clocks 36 A-D in the drift simulator 16 during the negative interval of the 4 Hz switching signal. This slightly higher frequency will be coupled through the logic gates 49 and 50 at the slightly higher 32 Hz switching rate. The slightly higher frequency will then be coupled from the output terminal of the logic gate 50 through the output terminals on the ground speed simulator 15 and spectrum generator 14 to the second input terminal on the mixer 13. The corresponding spectra produced at the differential output terminal of the mixer 13 as a result of the slightly higher frequency will be coupled into the right radar beam thereby simulating drift to the right.

Drift to the left is produced in a similar manner to that described above with respect to drift to the right except the slightly higher drift frequency from the corresponding one of the four drift clocks 36 A-D would be switched during the positive intervals of the 4 Hz switching rate.

It is understood that the drift right could be simulated by inserting the slightly higher frequency during the positive interval thereof and drift left could be inserted during the negative intervals thereof if the appropriate changes in phasing were made throughout the system.

Alternately if drift was to be simulated at only a single frequency, for example, only when clock sources 40A and 40B were selected, then only a single drift clock source such as clock source 36A having a frequency slightly higher than the higher frequency $f_H$ produced by the corresponding clock source would be required.

Figure 2:
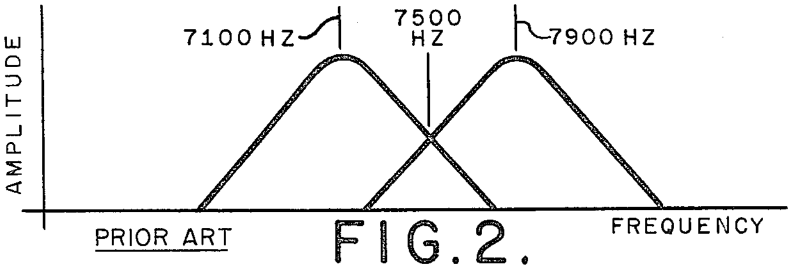
FIG. 2 is a graph of amplitude versus frequency of two spectra produced by a prior art generator showing a crossover point without any change in the center frequency $f_n$.
Figure 3:
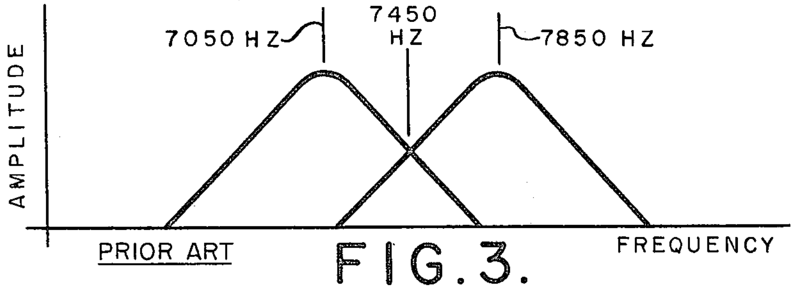
FIG. 3 is a graph of amplitude versus frequency of two spectra produced by a prior art generator showing a change in crossover point produced by a 50 Hz change in the center frequency $f_n$.

To illustrate the improvement over the prior art simulated doppler spectrum generator it will be assumed that the selected frequencies $f_H$ and $f_L$ are 107,900 Hz and 107,100 Hz respectively and $f_n$ is 100,000 Hz. In the prior art device the mixer 13 will then provide the pair of spectra shown in FIG. 2 at its difference output terminal. The first spectra will be centered at a frequency of (107,100 − 100,000) = 7,100 Hz and the second spectra will be centered at (107,900 − 100,000) = 7,900 Hz. It will be noted that the crossover frequency for this pair of spectra without any drift in the frequency $f_n$ = 100,000 Hz will be 7,500 Hz. However, if the center frequency of the input signal applied to the digital filter contained a spectrum slope, the resultant output from the digital filter might be $f_n$ = 100,050 Hz. Mixing this frequency with the aforementioned values of $f_H$ and $f_L$ would produce the crossover point shown in FIG. 3, i.e., 7,450 Hz.

Figure 4:
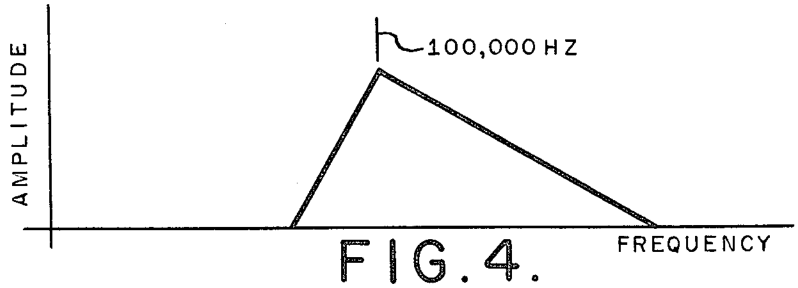
FIG. 4 is a graph of amplitude versus frequency of a spectra illustrating the effect of distortion in the spectra.
Figure 5:
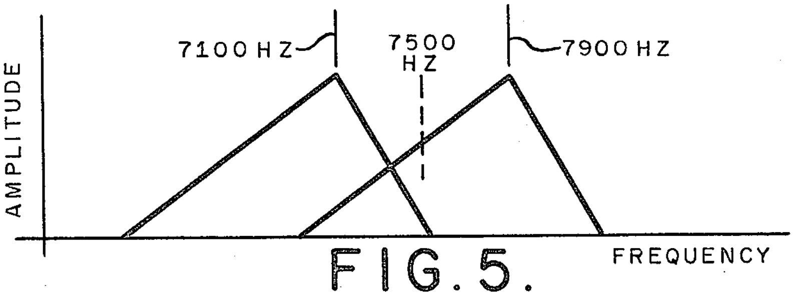
FIG. 5 is a graph of amplitude versus frequency of two spectra illustrating the shift in crossover point produced by distortion in each spectra.

Another source of error could be due to distortion of the narrow band noise output pulse signal centered at the frequency, $f_n$. FIG. 4 shows an overly distorted spectrum signal in which one side of the spectrum is shown as much longer than the other side while the maximum amplitude is centered at the desired center frequency $f_n$ of 100,000 Hz. The effect of this distortion in the difference output spectra produced at the output terminal of the mixer 13 is shown in FIG. 5. It can be appreciated that the crossover frequency has shifted to the left by a nominal amount from the desired crossover point 7,500 Hz.

Figure 6:
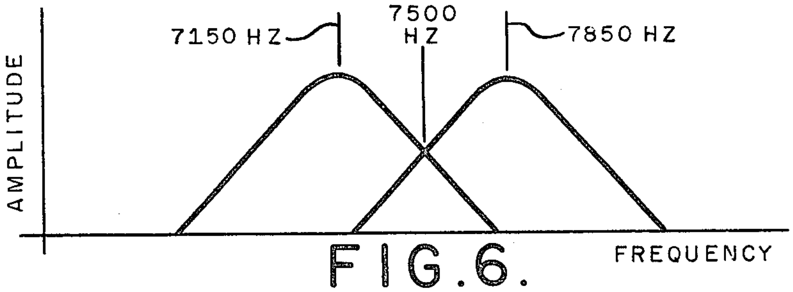
FIG. 6 is a graph of amplitude versus frequency of two spectra produced by a generator including the subject invention showing no change in crossover point being produced by a 50 Hz change in center frequency, $f_n$.

In the subject invention if the selected frequency $f_H$ is 107,900 Hz, the selected frequency $f_L$ is 92,900 Hz and the center frequency $f_n$ is 100,000 Hz. The spectra produced from this combination of frequencies would be the same as that shown in FIG. 2 above. However, if the center frequency $f_n$ is shifted due to drift to 100,050 Hz the resultant spectra will produce a crossover frequency at 7,500 Hz as shown in FIG. 6 which is exactly the same for the crossover frequency shown in FIG. 2 above. Thus it can be readily appreciated that the improved simulated doppler generator will provide precisely constant frequency crossovers for two spectra even in the presence of shift in the center frequencies $f_n$. Although the 50 Hz produces a 50 Hz shift in the position of the spectra peaks, the shift will be equal in magnitude and opposite in direction thereby maintaining the crossover frequency precisely constant. In the prior art device a 50 Hz shift in the center frequency, $f_n$, also produces a 50 Hz shift in the peaks of each of the spectra. However, the shifts are in the same direction and thereby produce a 50 Hz shift in the crossover frequency between the spectra.

Figure 7:
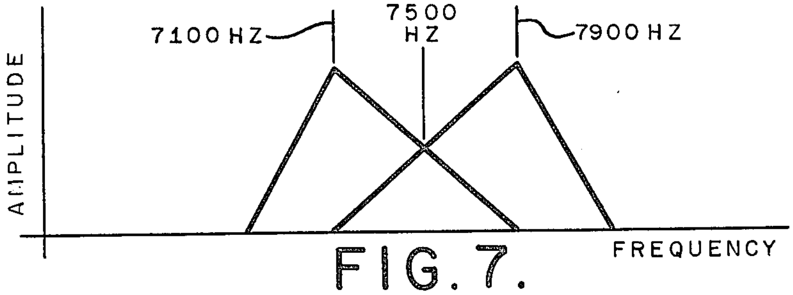
FIG. 7 is a graph of amplitude versus frequency of two spectra produced by a generator including the subject invention having distortion in each spectra without producing any shift in crossover point.

If distortion is present in the center frequency signal $f_n$ at the input to the mixer 13 as shown in FIG. 4, each spectra having a peak frequency lower than the crossover frequency will be a mirror image of each spectra having a peak frequency greater than the crossover frequency. Thus each pair of spectra produced at the difference output terminal of the mixer 13 will provide a crossover frequency which remains centered at the crossover frequency produced by spectra without distortion as shown in FIG. 7, i.e., in the example given the crossover frequency will remain at 7,500 Hz.

Thus from the foregoing description of the subject invention it can be appreciated that any change in the center frequency $f_n$ due to drift in the value of the frequency causes equal but opposite shifts in the peak frequencies of the two spectra produced at the difference output terminals of the mixer 13. This does not produce any change in the crossover frequency of the two spectra but merely results in changes in the power level at the crossover frequency. Furthermore, the presence of distortion in the narrow band output pulse signal from the digital filter having a center frequency $f_n$ does not produce a shift in the crossover frequency of the two spectra produced at the difference output terminal of the mixer 13 but does result in a change in the power level at the crossover frequency.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A simulated doppler generator comprising noise generating means for producing wideband noise output signals, clock source means for producing clock frequency signals at a frequency $f_n$ which may change in value due to drift, digital filter means having a first input terminal coupled to said noise generating means and a second input terminal coupled to said clock source means or producing narrow band noise output signals which are centered about said clock frequency signal, $f_n$, and may be subject to distortion, spectrum generating means for alternately providing first frequency signals at a first frequency, $f_H$, which are higher than said clock frequency signals, $f_n$, and second frequency signals at a second frequency, $f_L$, which are lower than said clock frequency signals, $f_n$, and mixer means having a first input terminal coupled to said digital filter means and a second input terminal coupled to said spectrum generating means for providing two spectra at the difference output terminals thereof having a crossover frequency of said spectras which remains precisely constant even in the presence of drift in said clock frequency signals, $f_n$, and distortion in said narrow band noise output signals.

2. A simulated doppler generator as recited in claim 1 in which said digital filter means includes means for providing narrow band noise output signals having selectable bandwidths.

3. A simulated doppler generator as recited in claim 2 in which said means for providing narrow band noise output signals having selectable bandwidths includes switch means coupled to said first input terminal and combinations of resistors and capacitors coupled to said switch means which provide selectable bandwidths in said digital filter means.

4. A simulated doppler generator as recited in claim 1 in which said spectrum generating means includes ground speed simulated means having a plurality of pairs of crystal controlled clock source means in which each pair includes a first clock source for providing said first frequency signals at different specific values of said first frequency $f_H$ and a second clock source for providing said second frequency signals at different specific values of said second frequency $f_L$.

5. A simulated doppler generator as recited in claim 4 in which said ground speed simulator means includes grounds speed logic gate means for alternately providing said first frequency signals and said second frequency signals at a 32 Hz switching rate.

6. A simulated doppler generator as recited in claim 4 in which said spectrum generating means further includes drift simulator means having a plurality of means each of which corresponds to a first clock source in each pair of said crystal controlled clock source means for providing drift frequency signals at frequencies slightly higher than said corresponding specific values of said first frequency signals and drift simulator logic gate means responsive to said first frequency signals and said drift frequency signals for alternately providing said first frequency signal at said first frequency, $f_H$, and said slightly higher drift frequency.

7. A simulated doppler generator as recited in claim 6 in which said drift simulator means further includes means for alternately providing said first frequency signals of said first frequency, $f_H$, and said slightly higher drift frequency at a 4 Hz switching rate.

* * * * *